(12) United States Patent
Nishiyama et al.

(10) Patent No.: US 9,150,947 B2
(45) Date of Patent: Oct. 6, 2015

(54) AUSTENITIC STAINLESS STEEL

(75) Inventors: Yoshitaka Nishiyama, Nishinomiya (JP); Nobuo Otsuka, Nishinomiya (JP)

(73) Assignee: NIPPON STEEL & SUMITOMO METAL CORPORATION, Tokyo (JP)

(*) Notice: Subject to any disclaimer, the term of this patent is extended or adjusted under 35 U.S.C. 154(b) by 233 days.

(21) Appl. No.: 11/907,268

(22) Filed: Oct. 10, 2007

(65) Prior Publication Data

US 2008/0107559 A1 May 8, 2008

Related U.S. Application Data

(63) Continuation of application No. PCT/JP2006/307457, filed on Apr. 7, 2006.

(30) Foreign Application Priority Data

Apr. 11, 2005 (JP) ................................. 2005-113402

(51) Int. Cl.
*C22C 38/42* (2006.01)
*C22C 38/00* (2006.01)

(52) U.S. Cl.
CPC ............... *C22C 38/42* (2013.01); *C22C 38/001* (2013.01); *C22C 38/005* (2013.01)

(58) Field of Classification Search
CPC ...... C22C 38/001; C22C 38/005; C22C 38/42
USPC ......................................................... 148/325
See application file for complete search history.

(56) References Cited

U.S. PATENT DOCUMENTS 4,530,720 A * 7/1985 Moroishi et al. ................ 420/43
6,918,968 B2 * 7/2005 Semba et al. .................. 148/327

FOREIGN PATENT DOCUMENTS

| JP | 06-271988 | 9/1994 |
|---|---|---|
| JP | 07-188869 | 7/1998 |
| JP | 10-265910 | 10/1998 |
| JP | 11-189848 | 7/1999 |
| JP | 11-279714 | 10/1999 |
| JP | 2000-303150 | 10/2000 |
| JP | 2003-001484 | 1/2003 |
| JP | 2003-171745 | 6/2003 |
| JP | 2004-083976 | 3/2004 |
| JP | 2004250783 A * | 9/2004 |

* cited by examiner

*Primary Examiner* — Jessee Roe
*Assistant Examiner* — Christopher Kessler
(74) *Attorney, Agent, or Firm* — Clark & Brody

(57) ABSTRACT

An austenitic stainless steel having excellent resistance to scale peeling which can suppress peeling of a protective oxide scale which is formed on the steel surface even when the steel undergoes repeated cycles of high temperature heating and cooling and which is suitable for use in a high temperature, humidified gas environment at a high temperature and particularly at 1023 K or above has a steel composition consisting essentially of C: 0.01-0.15%, Si: 0.01-3%, Mn: 0.01-2%, Cu: 0.1-2.5%, Cr: 23-30%, Ni: 16-25%, Al: 0.005-0.20%, N: 0.001-0.40%, P: at most 0.04%, S: at most 0.01%, at least one of Y and Ln series elements: a total of 0.005-0.1%, and a balance of Fe and unavoidable impurities, with the number of inclusions containing Y and Ln series elements in the steel surface being at most $5 \times 10^{-3}/\mu m^2$.

9 Claims, 2 Drawing Sheets

AUSTENITIC STAINLESS STEEL

CROSS-REFERENCE TO RELATED APPLICATIONS

This application is a continuation of International Patent Application No. PCT/JP2006/307457 filed on Apr. 7, 2006. This PCT application was not in English as published under PCT Article 21(2).

TECHNICAL FIELD

This invention relates to an austenitic stainless steel, and more particularly it relates to an austenitic stainless steel having superior resistance to scale peeling in a high temperature, humidified gas environment. An austenitic stainless steel according to the present invention is particularly suitable for applications in which heating and cooling cycles are frequently repeated in a high temperature, humidified gas environment such as for heat exchangers and reformers in distributed generation.

BACKGROUND ART

Microturbines and various types of fuel cells which are used in distributed generation are usually made in the form of co-generation systems including a heat exchanger (regenerator) which heats combustion air by utilizing the heat of combustion exhaust gas. The heat exchanger is constituted by corrugated fins, plates, and other parts made of stainless steel. It is desired that the stainless steel which is used have a high level of heat resistance and good weldability and workability.

Various fuels have been studied as a fuel source for supplying hydrogen in a fuel cell, such as natural gas, DME (dimethyl ether), kerosene, synthetic hydrocarbon fuels, and alcohol-based fuels. These fuels are reformed by a method such as steam reformation to generate hydrogen Due to the high operating temperature, it is desired that stainless steel which is used for the manufacture of such reformers also have a high level of heat resistance and good weldability and workability.

Gas which passes through the above-described heat exchangers and reformers contains from several percent to several tens of percent of steam and is at a high temperature. Such high temperature, humidified gas produces a severely corrosive environment compared to the atmosphere or to combustion exhaust gas from an automotive exhaust system.

In distributed generation, contrary to a conventional thermal power plant, starting and stopping of the operation of equipment occurs frequently, so the distributed generation is subjected to cyclic heating and cooling. As a result, a protective oxide scale primarily comprising Cr which is formed on the surface of stainless steel during heating develops thermal stresses during cooling and produces cracks, and eventually the scale peels off. In portions where the scale has peeled off, it is difficult to regenerate the protective scale, and frequently a non-protective oxide scale primarily comprising Fe is formed. As a result, a reduction in the wall thickness of the stainless steel is accelerated, and the service life of equipment is shortened. Furthermore, the peeled scale plugs up gas flow passages inside the equipment or gas flow passages connected to the exit side of the equipment. In addition, there is an extremely high danger of the peeled scale causing damage due to equipment by erosion.

Accordingly, it is desired that stainless steel used in applications such as heat exchangers or reformers for distributed generation have not only heat resistance, workability, and weldability, but also excellent resistance to scale peeling such that peeling of scale does not occur even when it undergoes repeated heating and cooling cycles in a highly corrosive, high temperature, humidified environment.

Up to now, many types of heat resistant Fe—Cr—Al ferritic stainless steels have been proposed as catalyst supports for cleaning equipment for automotive exhaust gas. However, ferritic stainless steels generally have poor workability and are difficult to weld, and they are difficult to apply to the above-described applications.

From in the past, austenitic stainless steels typified by SUS 304, SUS 316L, and SUS 310 have been much used for usual high temperature applications.

JP H07-188869 A1 discloses an inexpensive austenitic stainless steel which is superior with respect to resistance to oxidation at high temperatures, wear resistance, and creep properties and which has excellent weldability. This stainless steel comprises C: 0.05-0.15% (in this description, unless otherwise specified, percent means mass percent), Si: less than 1.0%, Mn: at most 2.0%, P: at most 0.04%, S: at most 0.01%, Cr: 20-30%, Ni: 10-15%, N: 0.10-0.30%, B: 0.0010-0.01%, La+Ce: 0.01-0.10%, Al: 0.01-0.20%, and a balance essentially of Fe and unavoidable impurities, with the Ni balance prescribed by {Ni+0.5Mn+30(C+N)−1.1 (Cr+1.5Si)+8.2} being in the range of −1.0% to +3%.

JP 2000-303150 A1 describes a stainless steel for direct diffusion bonding. This is a ferritic stainless steel comprising C: at most 0.08%, Si: 0.01-2%, Mn: 0.05-1.5%, P: at most 0.05%, S: at most 0.01%, Al: 0.005-0.1%, Cr: 13-32%, Ni: 0.01-4%, Mo: 0.1-6%, Ti: at most 0.05%, and a balance of Fe and unavoidable impurities, or an austenitic stainless steel comprising C: at most 0.08%, Si: 0.01-2%, Mn: 0.05-1.5%, P: at most 0.05%, S: at most 0.01%, Al: 0.005-0.1%, Cr: 13-25%, Ni: 7-15%, Si+Mo: at least 1.5%, Mo: at most 6%, Ti: at most 0.05%, and a balance of Fe and unavoidable impurities. This austenitic stainless steel is described as being easy to roll and having excellent workability.

However, the austenitic stainless steels described in the above-described publications do not take into consideration the above-mentioned resistance to scale peeling.

JP H11-279714 A1 discloses an austenitic stainless steel having improved resistance to scale peeling under conditions in which a temperature gradient is present in the material during heating and cooling cycles. This stainless steel comprises C: 0.01-0.15%, Si: 0.5-5%, Mn: 0.2-2%, P: at most 0.04%, S: at most 0.02%, Ni: 12-22%, Cr: 17-26%, Al: 0.01-5%, N: 0.02-0.4%, and a balance of Fe and unavoidable impurities, with the added amount of alloying elements, the maximum heating temperature TK, and the temperature gradient $\alpha$ (° C./mm) satisfying a prescribed relationship.

That austenitic stainless steel utilizes a phenomenon in which oxides of Si or Al which are concentrated at the boundary of scale or metallic Ni alleviate strains due to expansion and contraction applied to scale when a temperature gradient is present in a material to improve the resistance to scale peeling. Therefore, the contents of Ni, Si, and Al are important, and the contents of Cr, Ni, Si, and Al in the steel are prescribed by the maximum temperature T and the temperature gradient $\alpha$ in the material. However, the resistance to scale peeling of that stainless steel is not of a level which can satisfy the resistance to scale peeling needed in severe humidified gas corrosive environments containing from several percent to several tens of percent of steam. Furthermore, consideration is not given to regeneration after peeling of scale, and it is necessary to improve its stability with respect to long-term properties.

In JP 2003-171745 A1, the present inventors proposed an austenitic stainless steel plate containing C: 0.01-0.10%, Si: 0.01-1.0%, Cr; 19-26%, Ni: 10-35%, a total of 0.005-0.10% of at least one REM (rare earth metal), at least 0.01% of Mn satisfying {Mn≤2.8×REM−0.025×Ni+0.95}, and a balance of Fe and unavoidable impurities and having a thickness of at most 1.0 mm. That invention suppresses the growth rate of $Cr_2O_3$ by controlling the Mn content in accordance with the Ni content and the REM content in order to solve the phenomenon of "burnout" caused by abnormal oxidation in a thin steel plate such as a corrugated fin of distributed generation equipment.

In JP 2004-83976 A1, the present inventors farther proposed an austenitic stainless steel plate having high temperature oxidation resistance and containing C: 0.01-0.10%, Si: at most 1.0%, Cr: 23.0-27.0%, Ni: 17.0-23.0%, a total of 0.005-0.10% of at least one rare earth element, a Mn content of at most 2.0% satisfying the relationship {Mn≤0.05×Cr−0.20× plate thickness−0.55}, and a balance of Fe and unavoidable impurities and having a thickness of at most 0.5 mm. That invention improves the high temperature strength of $Cr_2O_3$ scale by controlling the relationship between the Mn content, the Cr content, and the plate thickness based on the finding that "accelerated oxidation" which develops in a steel plate with a thickness of at most 0.5 mm is caused by deformation occurring when the strength is overcome by the stress which develops in scale which forms on the surface of steel.

The austenitic stainless steel plates which are proposed by above-mentioned JP 2003-171745 A1 and JP 2004-83976 A1 can solve the problems of burnout and accelerated oxidation which develop in thin stainless steel plates. However, there is no recognition in those publications of peeling of scale which is a problem in the above-described heating and cooling cycles, and there is no suggestion concerning a method of solving that problem.

DISCLOSURE OF INVENTION

The present invention is an austenitic stainless steel having a steel composition consisting essentially of, in mass percent. C: 0.01-0.15%, Si: 0.01-3%, Mn: 0.01-2%, Cu: 0.1-2.5%, Cr: 23-30%, Ni: 16-25%, Al: 0.005-0.20%, N: 0.001-0.40%, P: at most 0.04%, S: at most 0.01%, a total of 0.005-0.1% of at least one rare earth element selected from Y and Ln series elements, optionally at least one of Nb, Ti, and V: 0.01-1.0% each, optionally at least one of Ca and Mg: 0.0001-0.010% each, optionally at least one of Mo, W, Ta, Re, and Ir: 0.01-6% each, optionally at least one of B, Zr, and Hf: 0.001-0.10% each, optionally Co: 0.01-3%, optionally at least one of Pd, Ag, Pt, and Au: 0.005-1% each, and a balance of Fe and unavoidable impurities, with the number of inclusions containing the above-described rare earth elements (referred to below as rare earth-containing inclusions) in the steel surface being at most $5 \times 10^{-3}/\mu m^2$.

In the present invention, an inclusion is intended to mean an inclusion having a minor axis of at least 0.5 μm. This is because an inclusion having a minor axis of smaller than 0.5 μm does not have a markedly adverse effect on resistance to scale peeling even if present in the surface of steel. The number of rare earth-containing inclusions can be measured by the method described below.

In addition to having good workability and weldability, an austenitic stainless steel according to the present invention exhibits excellent resistance to scale peeling such that it can prevent peeling of scale particularly even under the conditions of heating and cooling cycles in a high temperature, humidified environment. The Cu content, the content of at least one rare earth element selected from Y and Ln series elements, and the amount of rare earth-containing inclusions in the steel surface markedly contribute to improving this resistance to scale peeling.

In general, peeling of scale develops because the stress which develops in scale exceeds the adhesive strength between the scale and the base metal. Therefore, in order to increase the resistance to scale peeling, it is effective to decrease the stress which develops in the scale or to increase the adhesive strength between the scale and the base metal. Stress which develops in scale includes growth stress accompanying the growth of scale and thermal stress which develops at the time of cooling. Specific countermeasures can be generally divided into the following categories.

(1) Suppressing growth stress accompanying growth of scale by decreasing the growth rate of scale.

(2) Suppressing thermal stresses which develop in scale at the time of cooling by decreasing the temperature difference ΔT at the time of cooling and by decreasing the plate thickness in order to utilize deformation of the base metal.

(3) Increasing the adhesive strength between the scale and the base metal by increasing the bonding strength itself at the interface between the scale and the base metal and by suppressing the presence of foreign matter such as inclusions in the interface.

Among the above-described countermeasures, decreasing the temperature difference ΔT at the time of cooling in countermeasure (2) leads to a limitation on the operating conditions of equipment (such as microturbines and fuel cells) to which the present invention is directed, making it difficult to actually carry out that countermeasure. In addition, making the plate thickness small not only produces the above-described problems of accelerated oxidation and burnout but also creates the possibility of a decrease in high temperature strength.

The present inventors performed further studies focused on above-described countermeasures (1) and (3). As proposed in JP 2003-171745 A1, the present inventors already carried out similar studies on the growth rate of scale. However, due to below-described reasons (a) and (b), it is necessary to study the growth rate of scale under heating and cooling cycles from a new standpoint not considered before.

(a) The growth rate of scale is determined by the composition of elements in the scale which is formed.

(b) The composition of elements in the scale which is formed often depends upon the initial formation of scale. The initial formation of scale occurs before a product (such as a heat exchanger) reaches the operating temperature (the heating temperature), i.e., during the course of a temperature increase.

Namely, in order to decrease the growth rate of scale, in the case of an austenitic stainless steel, it is important to uniformly form a protective oxide (a protective scale) comprising primarily $Cr_2O_3$, and it is necessary to reliably form such scale during the course of a temperature increase. The formation of $Cr_2O_3$ on the surface of a steel plate already begins from approximately 773 K during the course of a temperature increase. However, at this relatively low temperature, the diffusion of Cr in steel is slow, so normally it is difficult to form a uniform a $Cr_2O_3$ scale. In addition, elements such as Fe and Mn dissolve in $Cr_2O_3$, and the growth rate of scale at the operating temperature cannot be suppressed. In order to form uniform and high purity $Cr_2O_3$, it is effective to increase the Cr content in steel. However, as described below, taking into consideration the mechanical properties and manufacturability of steel, there is a limit to the extent to which the Cr content can be increased.

As a result of detailed study of the behavior of initial oxidation during the course of a temperature increase in order to find a new method, it was found that the following (c)-(f) are essentially important.

(c) When oxidation of a steel surface is commenced, uniform $Cr_2O_3$ can be formed if Cr reacts with only the $O_2$ in gas react. However, in an actual gas atmosphere, a variety of gas molecules other than $O_2$ are present, and these various gas molecules are adsorbed by the steel surface and dissociate.

(d) If, for example, CO and the like are present in a gas atmosphere, the CO dissociates into C and O on the steel surface, and the C penetrates into the steel and causes carburization. For the same reasons, sulfurization occurs when $SO_2$ or $H_2S$ is present. Namely, not only oxidation but corrosion such as carburization, sulfurization, nitriding, or hydrogen penetration also progresses, and it is not possible to promote only an oxidation reaction. Due to the simultaneous occurrence of various reactions on the steel surface in this manner, it has not been possible thus far to uniformly form $Cr_2O_3$ in the initial stage of forming $Cr_2O_3$.

In order to study a means for solving the problem based on the mechanism which has been clarified in this manner, steel materials having different compositions were prepared in order to investigate the effect of elements in steel, and the surface reaction was carefully analyzed. As a result, it was found that Cu as well as Y and Ln series elements (rare earth elements) exhibit the following behavior, which is of great interest.

(e) Cu has the effect of suppressing dissociation of gas which is adsorbed and dissociated on the surface of steel, and it can suppress the advance of corrosion other than oxidation. As a result, $Cr_2O_3$ can be uniformly formed on the steel surface.

(f) If steel contains at least one rare earth element selected from Y and Ln series elements, elements such as Fe and Mn are prevented from dissolving in $Cr_2O_3$, and $Cr_2O_3$ having a high purity of Cr is uniformly formed on the surface of steel.

Based on the above findings (e) and (f), by adding Cu together with one or more of the above-described rare earth elements, a $Cr_2O_3$ scale having Cr of high purity can be uniformly formed on a steel surface during the course of a temperature increase. As a result, resistance to scale peeling can be greatly increased. This is because, in addition to the above-described (1) decrease in the growth rate of scale, (3) the bonding strength itself at the interface between the scale and the base metal is increased.

However, by this means alone, the improvement in the resistance to scale peeling which is the object of the present invention is not sufficient. By also lowering the amount of rare earth-containing inclusions present in the steel surface to at most a prescribed level peeling of scale originating at the inclusions can be prevented and resistance to scale peeling is markedly improved.

An austenitic stainless steel according to the present invention has excellent resistance to scale peeling which can suppress peeling of a protective oxide scale formed on a steel surface even when the steel undergoes heating and cooling cycles in which heating to a high temperature in a high temperature, humidified environment and cooling to room temperature are repeated. Therefore, it is suitable for use in a high temperature, humidified gas environment at a high temperature and particularly at 1023 K or above. In addition, its workability, weldability, and heat resistance are sufficiently high. Accordingly, when the steel is used in heat exchangers for microturbines and various types of fuel cells or in reformers of fuel cells which are expected to become more widespread for distributed generation, a decrease in thickness due to peeling of scale can be prevented and the service life of equipment is lengthened.

BEST MODE FOR CARRYING OUT THE INVENTION

Figure 1:
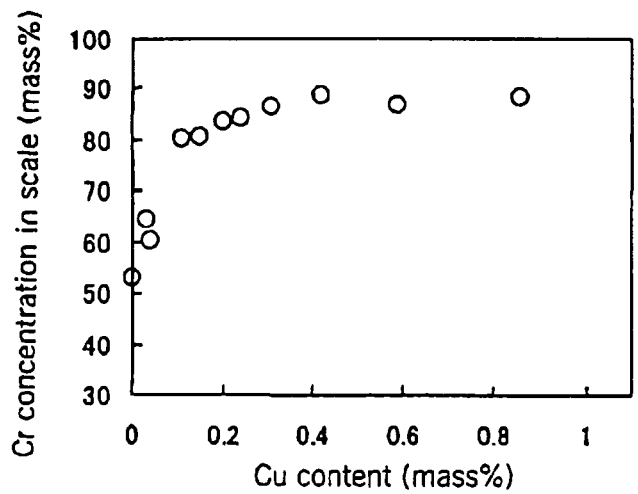
FIG. 1 is a graph showing the relationship between the concentration of Cr in scale which is formed and the content of Cu in steel.

Below, the present invention will be explained in detail while referring to the accompanying drawings. In this description, percent with respect to steel composition always means mass percent.

An austenitic stainless steel according to the present invention has a steel composition consisting essentially of, in mass percent, C: 0.01-0.15%, Si: 0.01-3%, Mn: 0.01-2%, Cu: 0.1-2.5%, Cr: 23-30%, Ni: 16-25%, Al: 0.005-0.20%, N: 0.001-0.40%, P: at most 0.04%, S: at most 0.01%, one or more rare earth elements selected from Y and Ln series elements: a total of 0.005-0.1%, and a balance of Fe and unavoidable impurities, with the number of inclusions containing the above-described rare earth elements (rare earth-containing inclusions) in the surface of the steel being at most $5 \times 10^{-3}/\mu m^2$.

As optional components, this austenitic stainless steel may further contain at least one of Nb, Ti, and V: 0.01-1.0% each, at least one of Ca and Mg: 0.0001-0.010% each, at least one of Mo, W, Ta, Re, and Ir: 0.01-6% each, at least one of B, Zr, and Hf: 0.001-0.10% each, Co: 0.01-3%, and at least one of Pd, Ag, Pt, and Au: 0.005-1% each.

The reasons for the above-described steel composition are as follows.

C: 0.01-0.15%

C has the effects of suppressing the formation of δ ferrite, stabilizing an austenitic structure, and guaranteeing high temperature strength. At least 0.01% of C is contained in order to exhibit these effects. If the C content exceeds 0.15%, a large number of clumps of $Cr_{23}C_6$ precipitate at the grain boundaries of the steel, thus the ductility of the steel decreases, and the resistance to thermal fatigue at the time of heating and cooling cycles deteriorates. The C content is preferably at least 0.02% to at most 0.12%.

Si: 0.01-3%

Si is added as a deoxidizing agent at the time of preparing a melt. It has the effect of increasing oxidation resistance by forming an oxide on the inner layer of a $Cr_2O_3$ scale in a high temperature, humidified environment. In order to exhibit this effect, at least 0.01% of Si is contained. If the Si content exceeds 3%, peeling of scale during heating and cooling cycles is promoted. A preferred range for the Si content is at least 0.05% to at most 2%, and a more preferred range is at least 0.1% and less then 1%.

Mn: 0.01-2%

Mn has the effect of forming an austenitic structure, and it also functions as a deoxidizing agent at the time of preparing a melt. In order to obtain these effects, the Mn content is made at least 0.01% of Mn. If the Mn content exceeds 2%, Mn partially dissolves in a $Cr_2O_3$ scale at the time of high temperature oxidation of steel, and as a result, the effect of Y and Ln series elements on suppressing the rate of oxidation is impeded. A preferred range for the Mn content is at least 0.1% to at most 1.2%, and a more preferred range is at least 0.6% to at most 1%.

Cu: 0.1-2.5%

Cu is one of the important elements in an austenitic stainless steel according to the present invention. Cu acts to suppress the adsorption and dissociation of gas on the surface of steel, and it preferentially promotes oxidation by suppressing corrosion such as carburization, sulfurization, nitriding, and penetration of hydrogen which can occur simultaneously with oxidation during the course of a temperature increase up to the operating temperature. As a result, as will be subsequently explained with respect to experimental results, a $Cr_2O_3$ scale having excellent protective properties can be uniformly formed on the steel surface during the course of a temperature increase, thus superior oxidation resistance can be maintained during subsequent holding at a high temperature, and peeling of scale can be greatly reduced. Furthermore, when the scale peels during cooling, a protective $Cr_2O_3$ scale can be regenerated during a subsequent temperature increase.

Such effects of Cu become marked when the Cu content is at least 0.1%. However, if the Cu content exceeds 2.5%, properties such as toughness and workability deteriorate. A preferred range for the Cu content is at least 0.2% to at most 2.5%, and a more preferred range is at least 0.3% to at most 2.2%.

Cr: 23-30%

Cr is one of the important elements in an austenitic stainless steel according to the present invention. Cr uniformly forms a protective $Cr_2O_3$ scale on a steel surface during a temperature increase, it exhibits oxidation resistance by suppressing the rate of oxidation during holding at a high temperature, and it increases resistance to scale peeling. Furthermore, when peeling of scale occurs during cooling, Cr acts to prevent a deterioration in oxidation resistance by uniformly regenerating a new protective $Cr_2O_3$ scale at the time of a subsequent temperature increase.

If the Cr content is smaller than 23%, a $Cr_2O_3$ scale is not uniformly formed on the steel surface, resistance to oxidation deteriorates, and the ability to regenerate scale after peeling also deteriorates. On the other hand, if the Cr content exceeds 30%, a large number of clumps of $Cr_{23}C_6$ precipitate at the crystal grain boundaries of the steel, the ductility of the steel decreases, and manufacturability also deteriorates. A preferred range for the Cr content is at least 23% to at most 28%, and a more preferred range is at least 24% to at most 28%.

Ni: 16-25%

Ni forms an austenitic structure and acts to increase the heat resistance of a steel plate. The Ni content is made at least 16% of Ni in order to obtain an austenitic structure. On the other hand, an Ni content exceeding 25% leads to a decrease in weldability and hot workability. A preferred range for the Ni content is at least 16% to at most 23%, and a more preferred range is at least 16% to at most 21.5%.

Al: 0.005-0.20%

Al is an element which can be added for the purpose of deoxidation at the time of preparing a melt. This effect is exhibited with a content of at least 0.005%. However, if the Al content exceeds 0.20%, AlN and $Ni_3Al$ precipitate, thereby causing the hot workability of the steel to markedly deteriorate and its creep rupture ductility to decrease. Furthermore, due to the presence of these precipitates, the uniform formation of a protective $Cr_2O_3$ scale on the surface of steel during a temperature increase, which is most important in the present invention, is impeded. Therefore, the Al content is made 0.20%. In order to suppress the formation of rare earth-containing inclusions, the Al content is preferably at least 0.02% to at most 0.15%, and a more preferred range is at least 0.04% and less than 0.15%.

N: 0.001-0.40%

N not only contributes to stabilizing an austenite structure, but it also has the effect of increasing high temperature strength. Furthermore, it suppresses dissociation of gas which is adsorbed by the steel surface at a high temperature and promotes the uniform formation of a $Cr_2O_3$ scale. This effect is achieved when the N content is at least 0.001%. However, in usual melting techniques, it is difficult to have an N content of more than 0.40%, so its upper limit is made 0.40%. When high temperature strength is considered important, the N content is preferably made at least 0.10% to at most 0.30%, and still more preferably at least 0.15% to at most 0.25%.

P: at Most 0.04%, S: at Most 0.01%

P and S are both impurities which segregate at grain boundaries and worsen hot workability. Their adverse effects are particularly great in a steel containing Cr, Ni, and N in the ranges of the present invention. They also have the adverse effect of promoting peeling of a $Cr_2O_3$ scale which is formed in a high temperature gas environment. Therefore, P and S are preferably made as low as possible. However, excessively decreasing their contents significantly increases costs, so P is made at most 0.04% and S is made at most 0.01%. Preferably, P is at most 0.035% and S is at most 0.005%, and more preferably P is at most 0.03% and S is at most 0.002%.

Y and Ln Series Elements: a Total of 0.005-0.1%

Like Cu, rare earth elements selected from Y and the Ln series are important elements in an austenitic stainless steel according to the present invention. By containing at least 0.005% to at most 0.1% of at least one rare earth element selected from Y and Ln series elements and by simultaneously limiting inclusions containing Y and Ln series elements (namely, rare earth-containing inclusions) in the steel surface to at most $5 \times 10^{-3}/\mu m^2$, resistance to scale peeling can be dramatically increased. This effect will be explained in detail below together with experimental data.

In order to obtain this effect, the total content of rare earth elements (Y and Ln series elements) is made at least 0.005%. On the other hand, if the content of rare earth elements becomes too large, the amount of inclusions which are formed increases, the resistance to scale peeling which is formed on the surface decreases, and the workability and toughness of the steel decrease. Therefore, the total content of rare earth elements is made at most 0.1%

Among Ln series elements, it is particularly preferable to use La, Ce, and Nd. The Ln series indicates element number 57 (La) to element number 71 (Lu). From the standpoint of resistance to scale peeling, a preferred total content of rare earth elements is at least 0.005% to at most 0.08%, and a more preferred content is at least 0.02% to at most 0.06%.

In addition to the above-described elements, an austenitic stainless steel according to the present invention may contain one or more of the following elements as optional elements.

Nb, Ti, and V: 0.01-1.0% Each

Nb, Ti, and V can improve high temperature strength, ductility, and toughness even when added in minute amounts. For each of these elements, these effects are not exhibited when the content is less than 0.01%, while if it exceeds 1.0%, workability and weldability decrease. Therefore, when at least one element selected from Nb, Ti, and V is added, the content of each is made at least 0.01% to at most 1.0%. A preferred content of these elements is at least 0.01% to at most 0.7%.

Ca and Mg: 0.0001-0.010% Each

Ca and Mg increase hot workability. This effect is obtained when at least 0.0001% each of either one is added. In particular, in a steel containing Cr, Ni, or N in the range defined by the present invention, there is a tendency for the strength of the grain boundaries to decrease relatively compared to the inside of grains, so by adding Ca and/or Mg, it is possible to greatly improve not only hot workability but also HAZ crack susceptibility at the time of welding. On the other hand, if the content of Ca and/or Mg exceeds 0.010% each, Ni—Ca or Ni—Mg compounds, which are low melting point compounds, form and hot workability ends up worsening. Accordingly, when one or more of Ca and Mg are added, the content of each is made at least 0.0001% to at most 0.010%, and a preferred content is at least 0.0003% to at most 0.007% for each of Ca and Mg.

Mo, W, Ta, Re, and Ir: 0.01-6% Each

Each of Mo, W, Ta, Re, and Ir has the effect of increasing high temperature strength as a solid solution strengthening element. In order to further increase high temperature strength, one or more of these is added as necessary. In order to exhibit an effect, it is necessary for the amount of any of these elements which is added to be at least 0.01%. However, if they are added excessively, workability deteriorates and structural stability is impeded. Therefore, the upper limit is made 6% for each element. When adding one or more of Mo, W, Ta, Re, and Ir, the content of each which is added is at least 0.01% to at most 6%, preferably at least 0.05% to at most 3% each, and still more preferably at least 0.1% to at most 1.4% each.

B, Zr, and Hf: 0.001-0.10% Each

Each of B, Zr, and Hf is effective at strengthening grain boundaries and improving hot workability and high temperature strength. Such effects are obtained when at least 0.001% each of any of these is added. However, if the respective contents exceed 0.10%, the susceptibility to high temperature cracks at the time of welding markedly increases. Accordingly, when one or more of these elements is added, the content of each which is added is made at least 0.001% to at most 0.10%, and a preferred content is at least 0.001% to at most 0.05% each.

Co: 0.01-3%

Co can stabilize an austenite phase by substituting for a portion of Ni. When this effect is desired, at least 0.01% of Co can be added. On the other hand, if more then 3% of Co is added, hot workability markedly decreases. Accordingly, the content of Co when it is added is at least 0.01% to at most 3%, and a preferred content is at least 0.1% to at most 1%.

Pd, Ag, Pt, and Au: 0.005-1% Each

Each of Pd, Ag, Pt, and Au can increase corrosion resistance. If the content of any of these elements which is added is less than 0.005%, its effect of increasing corrosion resistance is not obtained. On the other hand, if the content of these elements exceeds 1%, workability decreases and costs increase. When one or more of Pd, Ag, Pt, and Au is added, the content of each which is added is at least 0.005% to at most 1%, and a preferred content is at least 0.0050% to at most 0.5%.

The remainder of the composition of an austenitic stainless steel according to the present invention other than the above-described elements is Fe and unavoidable impurities.

The effect of Cu and rare earth elements (Y and Ln series elements) in an austenitic stainless steel according to the present invention on uniformly forming a protective $Cr_2O_3$ scale and thereby improving resistance to scale peeling will be explained more fully based on the following experimental data.

Test pieces were prepared by cutting sections measuring 1.2 mm thick, 15 mm wide, and 35 mm long from austenitic stainless steels having different compositions and then treating the surface of each section to give a mirror finish. Each of the prepared test pieces was placed in a heating furnace and heated from room temperature to 1123 K at a rate of temperature increase of 0.5 K per second. As soon as the temperature reached 1123 K, it was cooled to near room temperature and removed from the furnace. The amount of Cr in the oxide scale formed on the surface of the test pieces was measured using a SIMS.

FIG. 1 is a graph showing the relationship between the results of measurement using a SIMS (secondary ion mass spectrometer) of the amount of Cr in the oxide scale formed on the surface of the austenitic stainless steel and the Cu content of the steel.

As shown by the graph in FIG. 1, with a steel not containing Cu, the Cr concentration in the oxide scale (the maximum concentration of Cr in the oxide scale obtained by SIMS analysis) was 50-70%, whereas when the Cu content was at least 0.1%, the Cr concentration in the oxide scale increased to at least 80%. Namely, when an austenitic stainless steel contains at least 0.1% of Cu, $Cr_2O_3$ of high purity is uniformly formed during the course of a temperature increase.

Figure 2:
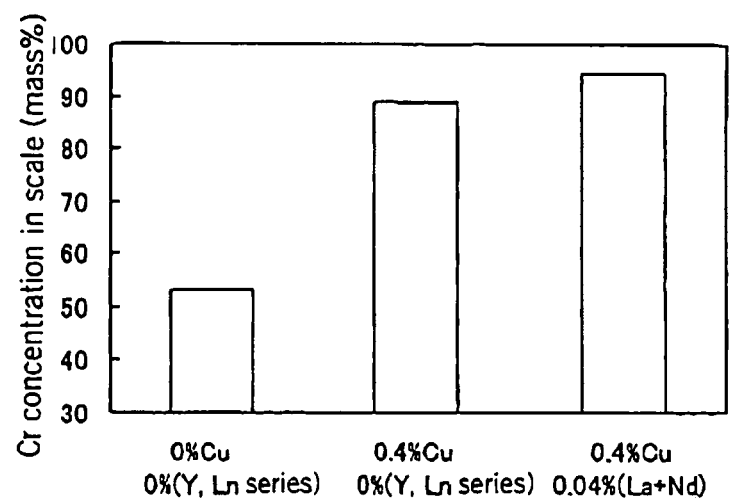
FIG. 2 is a graph showing the effect of the content of Cu, Y, and Ln series elements in steel on the concentration of Cr in scale which is formed.

FIG. 2 is a graph showing the results of measurement of the Cr concentration in an oxide scale when the same test was carried out on an austenitic stainless steel containing neither Cu nor rare earth elements, an austenitic stainless steel containing only Cu, and an austenitic stainless steel containing both Cu and rare earth elements.

As shown in the graph of FIG. 2, when both Cu and rare earth elements are present, the Cr concentration in the scale becomes a maximum. It can be seen that it is effective to add both Cu and rare earth elements in order to uniformly form $Cr_2O_3$.

When rare earth elements are oxidized by heating in air, they segregate as ions at the grain boundaries of $Cr_2O_3$ oxides, thereby suppressing the grain boundary diffusion of $Cr^{3+}$ and $O_2^-$ ions through the $Cr_2O_3$ grain boundaries accompanying the growth of $Cr_2O_3$ oxides and preventing Fe and Mn from dissolving into oxides. This effect is particularly marked during the course of a temperature increase in a steel to which they are added together with Cu. As a result, high purity $Cr_2O_3$ with a high concentration of Cr is formed, and the effect of slowing the growth rate of scale is obtained. Furthermore, in the course of a temperature increase after scale has peeled off during cooling, it is possible to regenerate high purity $Cr_2O_3$, which becomes a protective oxide scale. This effect can be obtained by adding a total of at least 0.005% of at least one rare earth element selected from Y and Ln series elements.

Rare Earth-Containing Inclusions in the Steel Surface: at Most $5 \times 10^{-3}/\mu m^2$ As stated above, in the present invention, uniformly forming a protective $Cr_2O_3$ scale with a high content of Cr in the initial stage of a temperature increase decreases the rate of oxidation in subsequent holding at a high temperature and can maintain good resistance to oxidation. It is also important in forming scale which is difficult to peel. Furthermore, it increases the bonding strength in the interface between the scale and the base metal, and it markedly improves resistance to scale peeling by suppressing the presence of foreign matter such as inclusions in the interface.

Increasing the bonding strength in the interface between the scale and the base metal can greatly suppress peeling of scale. Adding rare earth elements with this object is previously known. However, a sufficient improvement cannot be expected from this measure alone because inclusions present in the interface between the scale and the base metal become starting points for the peeling of scale.

Typical inclusions, which form at the time of preparing molten steel, are compounds such as oxides, sulfides, and oxysulfides remaining in steel. Oxides of Al, Si, or Mn, sulfides of Mn and Ca, and the like are known. There are cases in which inclusions are formed from a single one of these compounds, and there are also cases in which they are formed from a combination of two or more of these compounds.

In a steel containing a rare earth elements such as Y or an Ln series element, rare earth elements exhibit extremely strong deoxidizing and desulfurizing effects due to their strong affinity for oxygen and sulfur. As a result, they remove solid solution oxygen or solid solution sulfur and improve hot workability and weldability as well as resistance to scale peeling formed on the surface of steel in a high temperature atmosphere.

However, steel to which one or more rare earth elements are added contains a large number of inclusions containing the rare earth elements (rare earth-containing inclusions) comprising oxides and/or sulfides of rare earth elements which are formed by the above-described deoxidizing and desulfurizing effects of these elements, and this causes the cleanliness of steel to decrease. This is because oxides and sulfides of rare earth elements have an average molecular weight which is larger than that of steel. As a result, they do not readily float in molten steel at the time of refining, which makes them difficult to remove as slag and worsens the cleanliness of steel. Formation of these rare earth-containing inclusions becomes particularly marked in steel containing rare earth elements. These inclusions are difficult to suppress unless optimization of alloying elements or control of inclusions during refining is carried out. If such rare earth-containing inclusions are present in the surface of steel, they remain in the interface between the scale and the base metal after an oxide scale is formed on the surface in the environment of use and promote the peeling of scale.

It is already known that resistance to scale peeling is improved by the presence of a rare earth element in steel. In the present invention, by limiting the amount of rare earth-containing inclusions which are formed by adding rare earth elements (as stated earlier, these are primarily oxides, sulfides, or oxysulfides of rare earth elements), resistance to scale peeling is dramatically and fundamentally improved. This phenomenon will be explained more fully based on experimental results.

Figure 3:
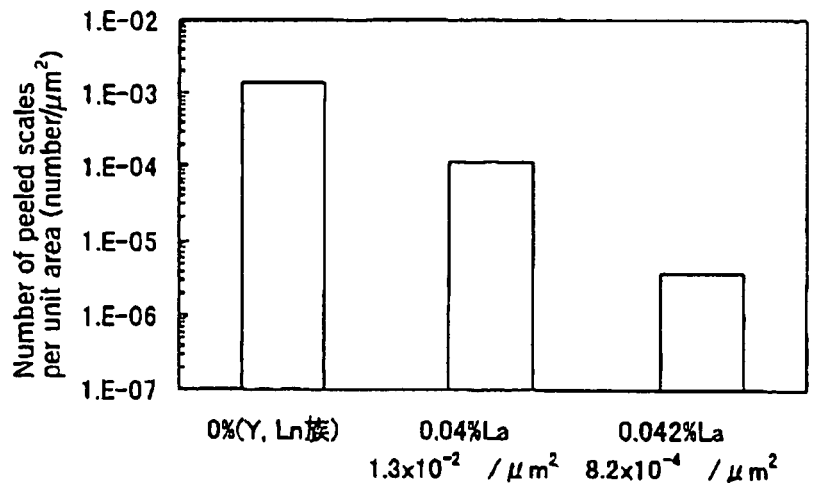
FIG. 3 is a graph showing the effect of Y and Ln series elements in steel and the influence of the number of inclusions containing Y and Ln series elements in the surface of steel on the number of occurrences of peeling of scale which is formed.

FIG. 3 is a graph showing the results of an investigation of the number of rare earth-containing inclusions and the number of occurrences of peeling of scale formed on the surface of steel when an oxidation test was carried out at 1173 K for 100 hours in air using a 25% Cr-20% Ni austenitic stainless steel and an austenitic stainless steel having the same composition except that 0.04% of La or 0.042% of La so was further added.

The number of occurrences of peeling of scale was found by observing the scale surface with an optical microscope at a magnification of 100× in 5 fields of view, counting the number of peeled portions having a minor axis with a length of at least 5 µm, and calculating the number per unit area (number per $\mu m^2$).

In order to measure rare earth-containing inclusions, prior to the oxidation test, the stainless steel surface was etched with a nitric acid/hydrochloric acid/glycerin mixture (volume ratio of concentrated nitric acid: concentrated hydrochloric acid:glycerin=1:4:1), the surface was observed under an optical microscope, the number of rare earth-containing inclusions having a minor axis with a length of at least 0.5 µm was counted in 5 fields of view at a magnification of 500×, and the number per unit area (number per $\mu m^2$) was calculated from this value. Determination of whether an inclusion was a rare earth-containing inclusion was performed by SEM-EDX (energy dispersive X-ray) analysis.

As shown by the graph in FIG. 3, the number of rare earth-containing inclusions observed in the stainless steel surface was $1.3 \times 10^{-2}/\mu m^2$ for an austenitic stainless steel to which 0.04% of La was added and was $8.2 \times 10^{-4}/m^2$ for an austenitic stainless steel to which 0.042% of La was added. The difference in the number of inclusions was due to differences in the refining method. Thus, even when the added amount of La is nearly the same, the number of rare earth-containing inclusions varies with the refining method.

The number of occurrences of peeling of scale for the 0.04% La steel was smaller by approximately a factor of 10 than for the steel to which La was not added, and it was still smaller by a factor of 10 for the 0.042% La steel in which the number of rare earth-containing inclusions was small. Thus, the resistance to scale peeling is increased just by adding La, but if the number of rare earth-containing inclusions is decreased, the resistance to scale peeling is further markedly improved.

Figure 4:
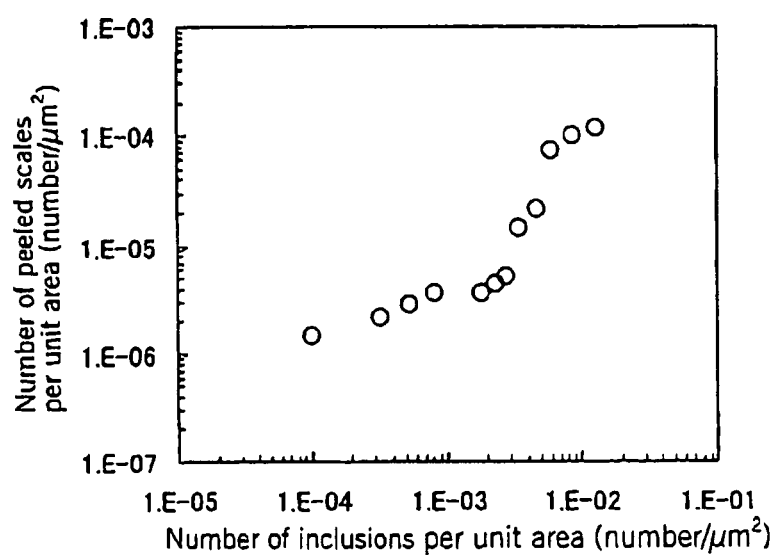
FIG. 4 is a graph showing the relationship between peeling of scale which is formed (the number of occurrences of peeling per unit area) and the number of inclusions (number per unit area) containing Y and Ln series elements in the surface of steel.

In order to clarify the relationship between the number of rare earth-containing inclusions and peeling of scale, test samples having various numbers of inclusions were prepared, and the same oxidation test as explained with respect to FIG. 3 was carried out. FIG. 4 is a graph showing the relationship between the number of rare earth-containing inclusions per unit area of the steel surface in this oxidation test and the number of occurrences of peeling of scale per unit area. It can be seen from the graph shown in FIG. 4 that peeling of scale can be effectively suppressed if the number of rare earth-containing inclusions in the steel surface is at most $5 \times 10^{-3}/\mu m^2$.

The number of rare earth-containing inclusions is preferably as small as possible, but reducing their number makes refining more difficult and increases costs, so it is important to reduce them within a practical range. From the standpoint of resistance to scale peeling, the number of rare earth-containing inclusions in the steel surface is preferably suppressed to at most $3 \times 10^{-3}/\mu m^2$.

With a rare earth element-added steel, if it is not suitably processed when preparing a melt, entrapment of inclusions is induced, and the number of rare earth element inclusions in the steel surface cannot be suppressed to at most $5 \times 10^{-3}/\mu m^2$. Therefore, when preparing a melt, by suitably agitating molten steel in the presence of a molten oxide slag having a composition which readily absorbs inclusions, the number of rare earth-containing inclusions in the steel surface can be suppressed to at most $5 \times 10^{-3}/m^2$. Specifically, at the stage of ladle refining, the composition of the slag in the ladle is controlled to one which readily absorbs inclusions by adding an auxiliary material such as calcined lime while the molten steel is agitated with an inert gas which is commonly used in ladle refining.

As stated above, rare earth-containing inclusions are oxides, sulfides, and/or oxysulfides of Y and Ln series elements, but sometimes they may also contain deoxidizing elements or desulfurizing elements such as Al, Si, Mn, Ca, and Mg. Reducing the number of rare earth-containing inclusions can be realized by adding a suitable amount of these deoxidizing elements or desulfurizing elements or by optimizing the conditions for preliminary deoxidation, complex deoxidation, and killing at the time of refining.

An austenitic stainless steel according to the present invention can be formed into a desired shape such as a steel plate or sheet, a seamless pipe, a welded pipe, bar steel, or forged steel by a suitable combination of processes selected from melting, casting, forging, hot working, cold working, welding, and the like. Alternatively, a desired shape may be formed by a method such as powder metallurgy or centrifugal casting. The final product may be as-worked by the immediately proceeding working process, or it may be subjected to heat treatment with the object of strain relief, grain size adjustment, dissolving of precipitates to form solid solution, and the like. The steel surface after undergoing heat treatment may be further subjected to surface treatment such as pickling, shot blasting, machining, polishing with a grinder, or electropolishing.

An austenitic stainless steel according to the present invention has excellent resistance to scale peeling which can suppress peeling of a protective oxide scale formed on the steel surface even if the steel undergoes heating and cooling cycles comprising repeated heating to a high temperature and cooling to room temperature. Therefore, the steel is suitable for use in a high temperature, humidified gas atmosphere at a high temperature and particularly at 1023 K or above.

This austenitic stainless steel has heat resistance, weldability, and workability which make it suitable for use as a structure material in heat exchangers (regenerators) of microturbines and various types of fuel cells and in reformers of fuel cells.

EXAMPLES

The present invention will be explained in further detail while referring to examples. The following examples are for the purpose of illustration and do not limit the present invention, 10 kg of each of the steels of Run Nos. 1-36 having the steel compositions shown in Table 1 (Run Nos. 1-32 were in the range of the present invention, and Run Nos. 33-36 were outside the range of the present invention) were melted in a vacuum induction heating furnace. In order to vary the number of inclusions, the steel of Run No. 17 underwent deoxidation at the time of refining under two different conditions (17a and 17b).

TABLE 1

| Run No. | Chemical composition of steel (mass %) [balance: Fe and impurities] | | | | | | | | | | | |
|---|---|---|---|---|---|---|---|---|---|---|---|---|
| | C | Si | Mn | Cu | Cr | Ni | Al | N | P | S | Y and Ln-series (REM) | Others |
| 1 | 0.04 | 0.44 | 0.45 | 0.4 | 25.8 | 17.2 | 0.07 | 0.18 | 0.021 | 0.002 | La: 0.02, Nd: 0.01 | — |
| 2 | 0.06 | 0.68 | 0.05 | 0.1 | 25.5 | 18.5 | 0.05 | 0.18 | 0.022 | 0.001 | Ce: 0.04 | — |
| 3 | 0.07 | 1.56 | 0.87 | 0.5 | 26.1 | 19.1 | 0.05 | 0.16 | 0.018 | 0.001 | Y: 0.02 | — |
| 4 | 0.03 | 0.87 | 0.64 | 0.6 | 26.2 | 19.4 | 0.08 | 0.02 | 0.019 | 0.001 | Y: 0.01, Pr: 0.01 | Nb: 0.2 |
| 5 | 0.03 | 0.13 | 0.87 | 0.6 | 25.7 | 17.6 | 0.07 | 0.16 | 0.024 | 0.001 | Sm: 0.01, La: 0.03 | Ti: 0.3 |
| 6 | 0.04 | 0.42 | 1.15 | 0.4 | 25.8 | 16.2 | 0.08 | 0.18 | 0.021 | 0.001 | La: 0.01, Ce: 0.02, Nd: 0.01 | Ca: 0.002 |
| 7 | 0.05 | 0.22 | 0.48 | 0.8 | 24.6 | 17.1 | 0.07 | 0.19 | 0.035 | 0.004 | La: 0.015 | Mg: 0.003 |
| 8 | 0.05 | 0.15 | 0.78 | 0.7 | 24.7 | 16.8 | 0.06 | 0.18 | 0.02 | <0.001 | Ce: 0.025 | Mo: 1.2 |
| 9 | 0.04 | 0.56 | 0.79 | 1.3 | 25.3 | 17.5 | 0.04 | 0.2 | 0.015 | 0.001 | La: 0.01, Ce: 0.02 | Re: 0.4 |
| 10 | 0.06 | 0.78 | 0.84 | 0.6 | 25.8 | 17.9 | 0.05 | 0.18 | 0.016 | 0.002 | Y: 0.01, Ce: 0.015 | W: 0.6 |
| 11 | 0.07 | 1.16 | 0.88 | 0.4 | 24.1 | 22.5 | 0.03 | 0.18 | 0.016 | 0.002 | Pr: 0.01, Nd: 0.005 | Ta: 0.2 |
| 12 | 0.05 | 0.44 | 0.76 | 0.3 | 26.9 | 18.7 | 0.07 | 0.19 | 0.012 | 0.001 | Nd: 0.04 | Ir: 0.7 |
| 13 | 0.08 | 0.44 | 0.27 | 0.5 | 24.7 | 18.1 | 0.08 | 0.19 | 0.009 | <0.001 | Nd: 0.04 | B: 0.002 |
| 14 | 0.13 | 0.38 | 0.27 | 0.4 | 26.5 | 19 | 0.07 | 0.21 | 0.005 | <0.001 | Nd: 0.08 | Zr: 0.05 |
| 15 | 0.04 | 0.68 | 0.26 | 0.6 | 24.8 | 16.3 | 0.05 | 0.24 | 0.017 | 0.001 | La: 0.02, Ce: 0.03, Nd: 0.01 | Hf: 0.05, Zr: 0.02 |
| 16 | 0.01 | 0.54 | 0.2 | 0.7 | 25.1 | 19.4 | 0.06 | 0.2 | 0.016 | 0.002 | Y: 0.04 | Co: 0.8 |
| 17 | 0.02 | 2.25 | 0.18 | 0.4 | 23.2 | 24.3 | 0.02 | 0.12 | 0.015 | <0.001 | Ce: 0.06 | Pd: 0.03 |
| 18 | 0.05 | 0.03 | 0.67 | 0.5 | 25 | 17.6 | 0.08 | 0.16 | 0.016 | 0.002 | La: 0.01 | Ag: 0.02 |
| 19 | 0.06 | 0.34 | 0.69 | 0.5 | 24.7 | 17.5 | 0.06 | 0.17 | 0.015 | 0.002 | Sm: 0.005, Nd: 0.005 | Pt: 0.5 |
| 20 | 0.07 | 0.33 | 0.73 | 0.9 | 26.3 | 16.8 | 0.05 | 0.18 | 0.013 | 0.001 | Y: 0.03 | Au: 0.02 |
| 21 | 0.05 | 0.45 | 0.79 | 0.2 | 26.1 | 17.9 | 0.07 | 0.17 | 0.016 | 0.002 | La: 0.018 | Nb: 0.4, Mo: 0.4 |
| 22 | 0.05 | 0.06 | 0.83 | 0.5 | 27.5 | 18.1 | 0.13 | 0.16 | 0.019 | <0.001 | Ce: 0.033 | Ti: 0.2, Zr: 0.02 |
| 23 | 0.04 | 0.41 | 0.51 | 0.4 | 26.1 | 17.3 | 0.08 | 0.18 | 0.02 | <0.001 | La: 0.015, Ce: 0.025, Nd: 0.005 | Nb: 0.1, Ca: 0.003 |
| 24 | 0.05 | 0.29 | 0.06 | 0.1 | 26.3 | 17.1 | 0.05 | 0.22 | 0.002 | 0.001 | Sm: 0.02, Nd: 0.06 | Ta: 0.3, Mg: 0.002 |
| 25 | 0.06 | 0.69 | 0.25 | 0.6 | 25.8 | 18.5 | 0.08 | 0.21 | 0.021 | 0.003 | Gd: 0.01 | Re: 0.2, Hf: 0.02 |
| 26 | 0.07 | 0.88 | 0.35 | 0.7 | 25.2 | 19.3 | 0.08 | 0.05 | 0.024 | 0.001 | La: 0.015, Y: 0.03 | Ca: 0.004, Zr: 0.03 |
| 27 | 0.04 | 0.36 | 0.88 | 0.9 | 28.1 | 16.8 | 0.07 | 0.23 | 0.02 | <0.001 | La: 0.025 | Ti: 0.3, Mo: 0.6, B: 0.002 |
| 28 | 0.03 | 0.36 | 0.94 | 0.7 | 26.2 | 17.8 | 0.07 | 0.18 | 0.028 | <0.001 | La: 0.015, Ce: 0.02, Nd: 0.01 | Ca: 0.004, W: 0.6, Hf: 0.03 |
| 29 | 0.01 | 0.2 | 0.76 | 0.6 | 26.3 | 17.8 | 0.05 | 0.21 | 0.006 | <0.001 | Nd: 0.03, Gd: 0.005 | V: 0.02, Mg: 0.003, Ir: 0.5 |
| 30 | 0.04 | 0.81 | 0.77 | 1.5 | 26.4 | 18.5 | 0.04 | 0.17 | 0.014 | 0.001 | Y: 0.005, La: 0.01, Ce: 0.02 | Nb: 0.7, Ca: 0.008, Zr: 0.06 |
| 31 | 0.12 | 0.54 | 0.64 | 0.4 | 29.4 | 18.5 | 0.09 | 0.26 | 0.038 | 0.007 | Sm: 0.01 | Co: 0.5, Pd: 0.3 |
| 32 | 0.05 | 1.45 | 0.42 | 0.5 | 23.5 | 19.4 | 0.01 | 0.19 | 0.031 | <0.001 | Pr: 0.01, Nd: 0.06 | Co: 1.2, Pt: 0.5, Ti: 0.4, Mo: 3.5 |
| 33 | 0.04 | 0.66 | 0.6 | 0 | 26.2 | 18.4 | 0.05 | 0.16 | 0.022 | 0.002 | — | — |
| 34 | 0.03 | 0.42 | 0.45 | 0.5 | 25.6 | 17.9 | 0.05 | 0.18 | 0.025 | 0.002 | — | — |
| 35 | 0.05 | 0.38 | 0.71 | 0.6 | 21.1 | 16.8 | 0.07 | 0.15 | 0.019 | <0.001 | La: 0.03, Ce: 0.03 | Nb: 0.2, Mo: 0.1 |
| 36 | 0.05 | 0.59 | 2.6 | 0.6 | 24.9 | 17.5 | 0.05 | 0.17 | 0.018 | <0.001 | Y: 0.025 | Ca: 0.003 |

Each ingot was heated for 2 hours at 1473 K and then was formed by hot forging into a plate with a thickness of 25 mm and a width of 90 mm. It was then heated for one hour at 1423 K and then hot rolled to obtain a thickness of 5 mm.

Each steel plate underwent softening at 1373 K and then was cold rolled to obtain a thickness of 1.2 mm. For some of the steel plates, the step of cold rolling the steel plate after softening at 1373 K was repeated to obtain a stainless steel plate having a thickness of 0.1-1.0 mm.

After each steel plate underwent final heat treatment and scale removal, five test pieces having a width of 15 mm and a length of 15 mm were cut from each steel to plate. After the surface of each test piece was etched with the above-described nitric acid/hydrochloric acid/glycerin mixture, it was observed under an optical microscope to find and count rare earth-containing inclusions having a minor axis of at least 0.5 mm with the aid of SEM-DEX analysis. The results are shown in Table 2. As shown in Table 2, among steels having a steel composition within the range of the present invention, Run Nos. 14 and 17b had a larger number of inclusions than the range defined by the present invention.

A high temperature oxidation test was performed using test pieces having a width of 15 mm and a length of 35 mm which were cut from the steel plate to be tested. The high temperature oxidation test was carried out in flowing gas under two conditions, i.e., gas condition 1: a gas composition of 3% $O_2$-16% $H_2O$-9% $CO_2$-bal. $N_2$ simulating exhaust gas from the combustion of city gas, and gas condition 2: a gas composition of 1% $CH_4$-7% $CO_2$-12% CO-20% $H_2O$-bal. $H_2$ simulating reformation of city gas. Each condition was continued for a maximum of 3650 cycles (corresponding to 10 years of operation of an apparatus which performs one cycle of heating and cooling per day), with each cycle comprising heating at 1223 K for 25 minutes and then air cooling to room temperature.

Every 50 cycles, the test pieces were removed, the change in weight of the test pieces was measured with an electronic balance, and the state of peeling of oxide scale formed on the surface of the test pieces and the formation of scale from the cross section and the base metal in its vicinity were observed with an optical microscope to ascertain whether there was peeling of scale. As peeling of scale proceeds, resistance to oxidation deteriorates, so the weight of the test pieces decreases with the number of test cycles and the test pieces decrease in thickness. Therefore, in evaluating resistance to scale peeling, it was determined that the resistance to scale peeling was excellent if the changed weight was at least −20 mg/cm². The test results are compiled in Table 2.

TABLE 2

| Run No. | Number of inclusions per μm² | Change in weight of test piece (mg/cm²) | |
|---|---|---|---|
| | | Gas condition (1) | Gas condition (2) |
| 1 | 4.2 × 10−4 | 4 | 1.8 |
| 2 | 3.6 × 10−3 | −10.5 | −5 |
| 3 | 4.4 × 10−4 | 1.2 | 1.4 |
| 4 | 1.2 × 10−4 | 2.2 | 1.6 |
| 5 | 1.5 × 10−3 | −5.5 | −1.1 |
| 6 | 6.4 × 10−4 | 2.2 | 1.8 |
| 7 | 2.1 × 10−4 | 1.4 | 2 |
| 8 | 8.2 × 10−4 | −0.5 | 0.6 |
| 9 | 6.3 × 10−4 | 1.5 | 1.4 |
| 10 | 4.5 × 10−4 | 1.8 | 2 |
| 11 | 2.7 × 10−3 | −2.6 | −3.2 |
| 12 | 1.2 × 10−3 | 3.5 | 2.2 |
| 13 | 9.5 × 10−4 | 3.2 | 2.4 |
| 14 | 6.1 × 10−3 | −24.2 | −32.3 |

TABLE 2-continued

| Run No. | Number of inclusions per μm² | Change in weight of test piece (mg/cm²) | |
|---|---|---|---|
| | | Gas condition (1) | Gas condition (2) |
| 15 | 3.4 × 10−3 | 5.2 | 3.6 |
| 16 | 1.3 × 10−3 | 2.1 | 1.7 |
| 17a | 2.5 × 10−3 | −4.5 | −5.9 |
| 17b | 8.5 × 10−3 | −25.8 | −24.5 |
| 18 | 7.6 × 10−4 | −3.5 | −1.9 |
| 19 | 2.2 × 10−4 | 0.8 | 1.4 |
| 20 | 5.4 × 10−4 | 1.8 | 1.1 |
| 21 | 4.3 × 10−4 | −5.4 | −3.3 |
| 22 | 3.4 × 10−4 | −0.7 | 1.6 |
| 23 | 1.5 × 10−3 | 3 | 1.7 |
| 24 | 4.3 × 10−3 | −12.8 | −7.6 |
| 25 | 1.5 × 10−4 | −3.4 | −2.8 |
| 26 | 6.6 × 10−4 | −1.1 | −2.3 |
| 27 | 4.7 × 10−4 | 2.1 | 2.5 |
| 28 | 3.6 × 10−3 | −4.2 | −2.4 |
| 29 | 1.4 × 10−3 | −4 | −1.3 |
| 30 | 8.7 × 10−4 | 2.6 | 1.1 |
| 31 | 3.4 × 10−4 | −0.5 | 1.6 |
| 32 | 4.7 × 10−3 | 3.2 | 2.7 |
| 33 | Not detected | −40.6 | −24.5 |
| 34 | Not detected | −34.5 | −22.2 |
| 35 | 2.5 × 10−3 | −55.3 | −25.5 |
| 36 | 7.6 × 10−4 | −26.5 | −21.7 |

(Notes)
Underlined values are outside the range of the present invention. Run Nos. 33-36 had steel compositions outside the range defined herein.

For each of Run Nos. 33-36 which were comparative steels, the weight of the test pieces after 3650 cycles decreased to −20 mg/cm² or less, indicating that their resistance to scale peeling was inferior. Among Run Nos. 1-32, for Run Nos. 14 and 17b for which the number of inclusions was outside the range of the present invention, the weight of the test pieces decreased to −20 mg/cm² or less, and the resistance to scale peeling was inferior.

In contrast, with Run Nos. 1-13, 15-17a, and 18-32 which were steels according to the present invention, the weight of the test piece after 3650 cycles was at least −20 mg/cm² for each, and they had excellent resistance to scale peeling.

A preferred mode of the present invention was described above, but the present invention is not limited thereto. Various modifications are possible without departing from the scope of the present invention.

The invention claimed is:

1. An austenitic stainless steel having a steel composition consisting essentially of, in mass percent, C: 0.01-0.15%, Si: not less than 0.05%, but less than 1, Mn: 0.01-2%, Cu: 0.1-1.5%, Cr: 23-30%, Ni: 16-25%, Al: 0.04-0.20%, N: 0.001-0.40%, P: at most 0.04%, S: at most 0.01%, at least one rare earth element selected from Y and Ln series elements: a total of 0.005-0.1%, Nb, Ti, and V: 0-1.0% each, Ca and Mg: 0-0.010% each, Mo, W, Ta, Re, and Ir: 0-6% each, B, Zr, and Hf: 0-0.10% each, Co: 0-3%, Pd, Ag, Pt, and Au: 0-1% each, and a balance of Fe and unavoidable impurities, with the number of inclusions containing the above-described rare earth elements in the surface of the steel being at most 4.7× $10^{-3}$/μm², wherein the change of weight is at least −20 mg/cm² after 3650 cycles of an oxidation test in flowing gas under conditions of a gas composition of 3% $O_2$-16% $H_2O$-9% $CO_2$-bal.$N_2$, each cycle comprising heating at 1223° K for 25 minutes and then air cooling to room temperature.

2. An austenitic stainless steel as set forth in claim 1 wherein the steel composition consists essentially of 0.01-1.0% each of at least one of Nb, Ti, and V.

3. An austenitic stainless steel as set forth in claim 1 wherein the steel composition consists essentially of 0.0001-0.010% each of at least one of Ca and Mg.

4. An austenitic stainless steel as set forth in claim 1 wherein the steel composition consists essentially of 0.01-6 mass % each of at least one of Mo, W, Ta, Re, and Ir.

5. An austenitic stainless steel as set forth in claim 1 wherein the steel composition consists essentially of 0.001-0.10% each of at least one of B, Zr, and Hf.

6. An austenitic stainless steel as set forth in claim 1 wherein the steel composition consists essentially of 0.01-3% of Co.

7. An austenitic stainless steel as set forth in claim 1 wherein the steel composition consists essentially of 0.005-1% each of at least one of Pd, Ag, Pt, and Au.

8. An austenitic stainless steel as set forth in claim 1 wherein the number of inclusions containing the rare earth elements in the surface of the steel being at most $3 \times 10^{-3}/\mu m^2$.

9. An austenitic stainless steel as set forth in claim 1 wherein N is 0.10-0.40%.

* * * * *